US009265086B2

(12) United States Patent
Wu et al.

(10) Patent No.: US 9,265,086 B2
(45) Date of Patent: Feb. 16, 2016

(54) ADDRESSING RADIO LINK FAILURES IN WIRELESS COMMUNICATION SYSTEMS

(71) Applicant: QUALCOMM Incorporated, San Diego, CA (US)

(72) Inventors: Yongle Wu, San Diego, CA (US); Muralidharan Murugan, San Diego, CA (US); Nitin Pant, San Diego, CA (US); Daniel Amerga, San Diego, CA (US); Shivratna Giri Srinivasan, Chennai (IN); Srivatsa Venkata Chivukula, San Diego, CA (US); Raghu Hanumantha Gowda, San Diego, CA (US); Kiran Patil, San Diego, CA (US); Sandeep Kumar Sunkesala, San Diego, CA (US); Gilbert Anpei Fu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/503,886

(22) Filed: Oct. 1, 2014

(65) Prior Publication Data

US 2015/0105066 A1 Apr. 16, 2015

Related U.S. Application Data

(60) Provisional application No. 61/889,388, filed on Oct. 10, 2013, provisional application No. 61/896,421, filed on Oct. 28, 2013.

(51) Int. Cl.
*H04W 24/08* (2009.01)
*H04W 24/06* (2009.01)
(Continued)

(52) U.S. Cl.
CPC ............ *H04W 76/046* (2013.01); *H04W 36/08* (2013.01); *H04W 48/02* (2013.01); *H04W 76/027* (2013.01); *H04W 76/028* (2013.01)

(58) Field of Classification Search
CPC ..... H04W 24/08; H04W 24/06; H04W 24/00; H04W 76/028; H04W 76/046; H04L 12/2697
See application file for complete search history.

(56) References Cited

U.S. PATENT DOCUMENTS 8,238,920 B2 8/2012 Zetterberg et al.
8,565,753 B2 * 10/2013 Hamabe ................ H04W 24/10
455/423

(Continued)

FOREIGN PATENT DOCUMENTS

WO WO-2009/148378 A1 12/2009
WO WO-2011/100540 A1 8/2011
WO WO-2014/089051 A1 6/2014

OTHER PUBLICATIONS

International Search Report and Written Opinion—PCT/US2014/058902—ISA/EPO—Mar. 31, 2015. (11 total pages).

*Primary Examiner* — Sharad Rampuria
*Assistant Examiner* — Obidon Bassinan
(74) *Attorney, Agent, or Firm* — Arent Fox LLP

(57) ABSTRACT

Methods and apparatus for enhanced radio resource control (RRC) reestablishment in a communication system include addressing repeated radio link failures (RLFs). For example, the methods and apparatus include incrementing a counter value associated with a first cell based on a detection of a RLF by a user equipment (UE) in a RRC connected state with the first cell. The methods and apparatus further include determining that the counter value meets or exceeds a first barring threshold value within a cell barring evaluation time duration. Additionally, the methods and apparatus include prohibiting the UE from performing an RRC reestablishment procedure with the first cell for a first barring time duration.

26 Claims, 12 Drawing Sheets

(51) Int. Cl.
  *H04W 24/00*  (2009.01)
  *H04W 16/18*  (2009.01)
  *H04W 76/04*  (2009.01)
  *H04W 48/02*  (2009.01)
  *H04W 36/08*  (2009.01)
  *H04W 76/02*  (2009.01)

(56) References Cited

U.S. PATENT DOCUMENTS

2010/0330920 A1    12/2010  Koskela et al.
2011/0096671 A1*   4/2011   Lindstrom .......... H04W 76/027
                                                    370/242
2011/0199905 A1*   8/2011   Pinheiro ............... H04W 4/005
                                                    370/235
2012/0083262 A1*   4/2012   Dimou .............. H04W 36/0055
                                                    455/423
2012/0281548 A1*   11/2012  Lin ....................... H04W 36/30
                                                    370/242
2013/0115959 A1*   5/2013   Amirijoo .......... H04W 36/0083
                                                    455/440
2013/0182563 A1*   7/2013   Johansson ........... H04W 76/027
                                                    370/228
2013/0273918 A1    10/2013  Watanabe
2014/0133465 A1    5/2014   Johansson et al.
2014/0148169 A1*   5/2014   Li ..................... H04W 36/0061
                                                    455/437
2014/0177429 A1    6/2014   Patil et al.

* cited by examiner

ADDRESSING RADIO LINK FAILURES IN WIRELESS COMMUNICATION SYSTEMS

CLAIM OF PRIORITY

The present application for patent claims priority to Provisional Application No. 61/889,388 entitled "METHODS AND APPARATUS FOR ADDRESSING RADIO LINK FAILURES IN WIRELESS COMMUNICATION SYSTEMS" filed Oct. 10, 2013, and Provisional Application No. 61/896,421 entitled "METHODS AND APPARATUS FOR ADDRESSING RADIO LINK FAILURES IN WIRELESS COMMUNICATION SYSTEMS" filed Oct. 28, 2013, and both of which are assigned to the assignee hereof and hereby expressly incorporated by reference herein.

BACKGROUND

The present disclosure relates generally to communication systems, and more particularly, to addressing repeated radio link failures in wireless communication systems.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

In some wireless communication networks, failures in establishing or maintaining network connection may result in significant degradations in wireless communication performance and quality. Further, in such scenarios, limitations may exist in remedying the degradations. Thus, improvements in reselection procedures are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method of enhanced radio resource control (RRC) reestablishment in a wireless communication system includes incrementing a counter value associated with a first cell based on detection of a radio link failure (RLF) by a user equipment (UE) in a radio resource control (RRC) connected state with the first cell. The method further includes determining that the counter value meets or exceeds a first barring threshold value within a cell barring evaluation time duration. Additionally, the method includes prohibiting the UE from performing an RRC reestablishment procedure with the first cell for a first barring time duration.

In another aspect, a computer-readable medium storing computer executable code for enhanced radio resource control (RRC) reestablishment includes code executable to increment a counter value associated with a first cell based on a detection of a radio link failure (RLF) by a user equipment (UE) in a RRC connected state with the first cell. The computer-readable medium further includes code executable to determine that the counter value meets or exceeds a first barring threshold value within a cell barring evaluation time duration. Additionally, the computer-readable medium includes code executable to prohibit the UE from performing an RRC reestablishment procedure with the first cell for a first barring time duration.

In a further aspect, an apparatus for enhanced radio resource control (RRC) reestablishment in a communication system includes means for incrementing a counter value associated with a first cell based on detection of a radio link failure (RLF) by a user equipment (UE) in a RRC connected state with the first cell. The apparatus further includes means for determining that the counter value meets or exceeds a first barring threshold value within a cell barring evaluation time duration. Additionally, the apparatus includes means for prohibiting the UE from performing an RRC reestablishment procedure with the first cell for a first barring time duration.

In an additional aspect, an apparatus for enhanced radio resource control (RRC) reestablishment in a communication system includes a reselection component configured to increment a counter value associated with a first cell based on detection of a radio link failure (RLF) by a user equipment (UE) in a RRC connected state with the first cell. The apparatus further includes a cell bar determiner configured to determine that the counter value meets or exceeds a first barring threshold value within a cell barring evaluation time duration. Additionally, the apparatus includes a prohibition component configured to prohibit the UE from performing an RRC reestablishment procedure with the first cell for a first barring time duration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout, where a dashed line may indicate an optional component or action, and wherein.

DETAILED DESCRIPTION

Figure 1:
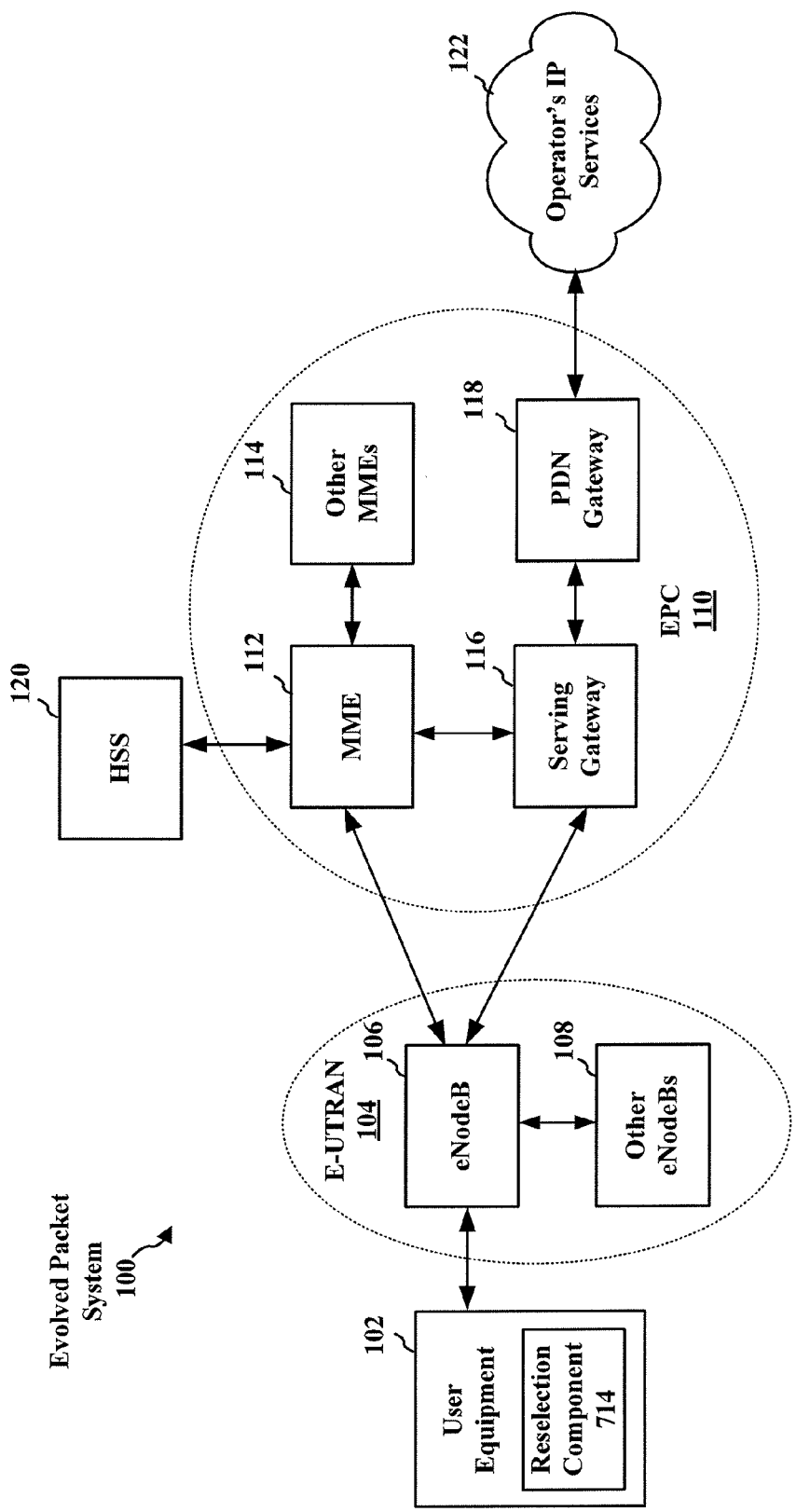
FIG. 1 is a diagram illustrating an example of a network architecture according to an aspect of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts. In an aspect, the term "component" as used herein may be one of the parts that make up a system, may be hardware, firmware, and/or software, and may be divided into other components.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The present aspects generally relate to addressing radio link failures (RLFs) in a wireless communication system. Specifically, in some wireless communication systems, during an on-going call, a user equipment (UE) may experience one or more RLFs due to, for example, poor network conditions with a serving cell. That is, in detecting one or more RLFs, the UE may detect that the signal strength of the radio channel carrying the call may be weak or rapidly degrading and hence is no longer suitable for use to continue the call. Accordingly, such detection may cause or trigger the UE to perform cell reselection or handoff to transfer the call to another cell. For example, the UE may camp on the most suitable cell and attempt a radio resource control (RRC) connection reestablishment procedure with at least the most suitable cell. However, in some scenarios, the UE, due to deficient network configurations in addition to the poor network conditions, may continue to identify the current cell with which it is communicating with as the desired target for cell reselection. In other words, the UE may be unable to reselect to another cell. Hence, the UE may experience continuous RLFs as the UE is unable to relinquish RRC connection from the current cell to another more suitable cell.

As such, the present aspects may prohibit the UE from attempting RRC reestablishment on a current serving cell for a given period of time so as to provide the UE an opportunity to reselect (e.g., perform RRC reestablishment) to a potentially more suitable cell. Accordingly, in some aspects, the present methods and apparatus may provide an efficient solution, as compared to current solutions, to enable the UE to reselect or otherwise engage in RRC connection reestablishment with potentially more suitable cells, e.g. relative to a serving cell, providing communication coverage to the position of the UE. Additionally, the present methods and apparatus may provide a mechanism by which to overcome deficient network configurations of the UE.

FIG. 1 is a diagram illustrating an LTE network architecture 100. The LTE network architecture 100 may be referred to as an Evolved Packet System (EPS) 100. The EPS 100 may include one or more user equipment (UE) 102, which may include reselection component 720 (FIG. 7) configured to prohibit the UE from attempting RRC reestablishment on a current serving cell for a given period of time, e.g., based on a RLF, so as to provide the UE an opportunity to reselect (e.g., perform RRC reestablishment) to a potentially more suitable cell. Additionally, EPS 100, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The mobility module entity (MME) 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
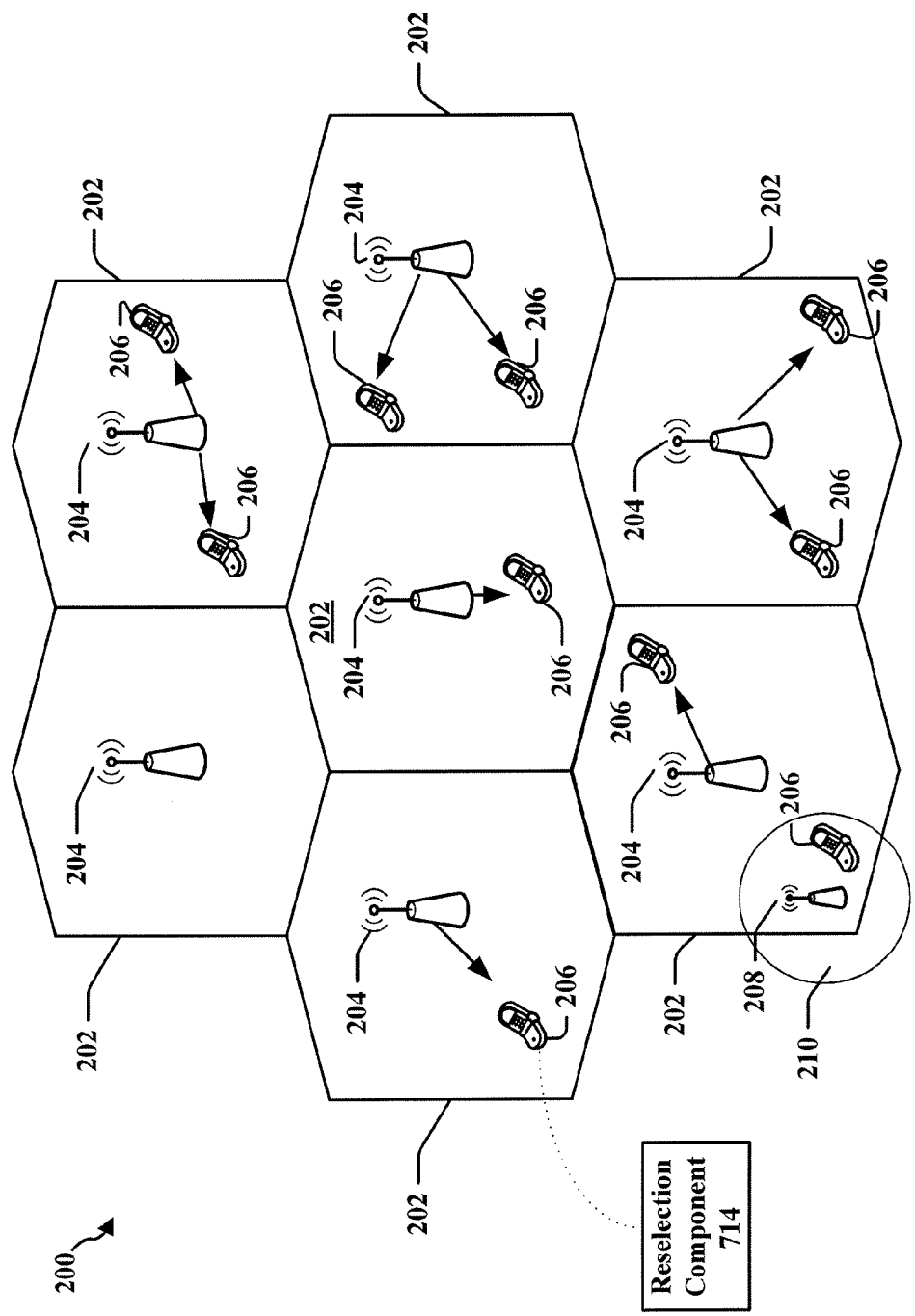
FIG. 2 is a diagram illustrating an example of an access network in according to an aspect of the present disclosure.

FIG. 2 is a diagram illustrating an example of an access network 200 in an LTE network architecture in which one or more UEs 206 may each include reselection component 720 (FIG. 7), as discussed herein. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations.

These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
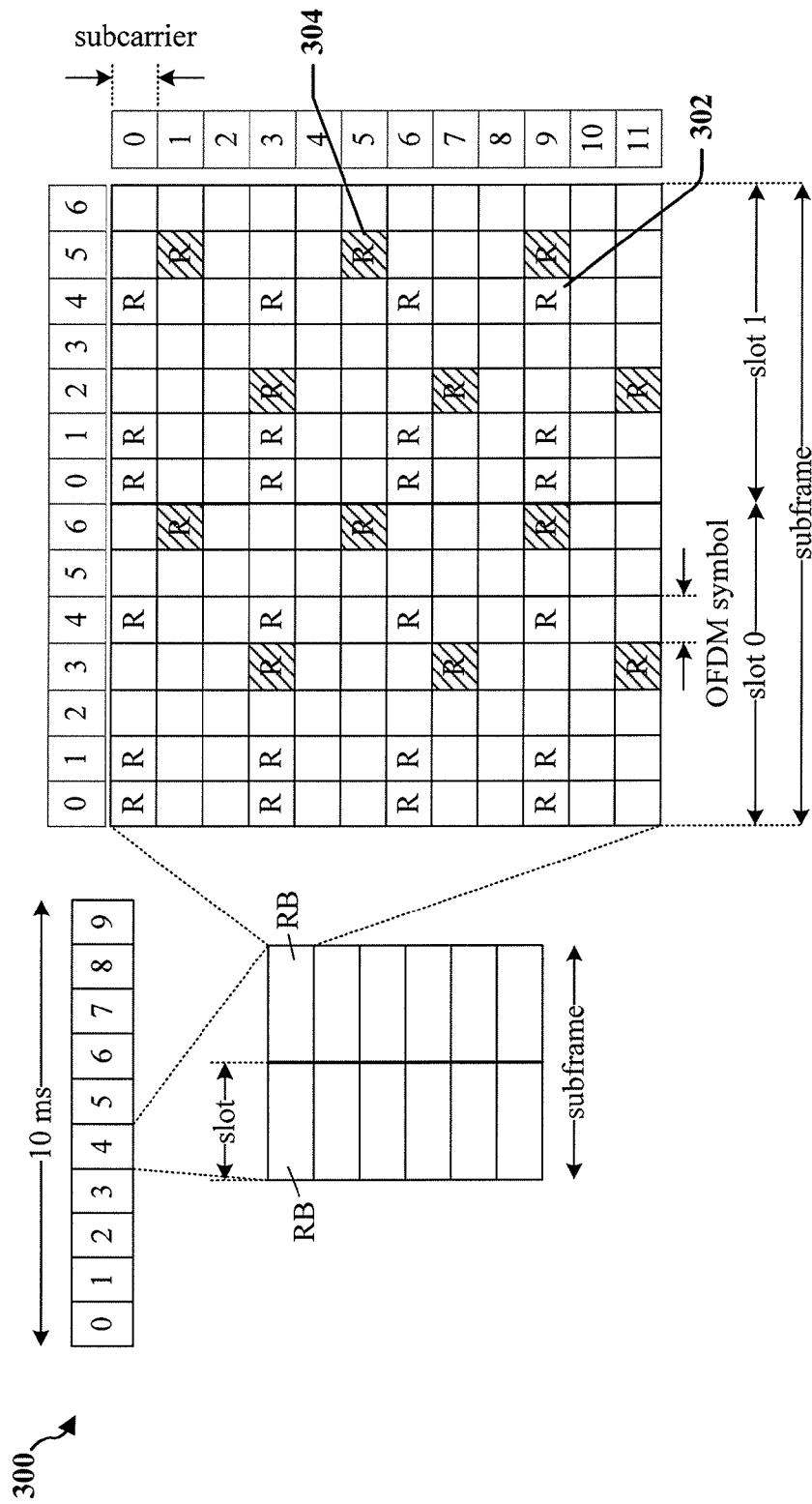
FIG. 3 is a diagram illustrating an example of a DL frame structure in LTE in accordance with an aspect of the present disclosure.

FIG. 3 is a diagram 300 illustrating an example of a DL frame structure in LTE, which may be received by a UE, such as UE 702 (FIG. 7) that includes reselection component 720 (FIG. 7) as described herein. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PD-SCH) is mapped. The number of bits carried by each resource element depends on the modulation scheme. Thus, the more resource blocks that a UE, such UE 702 of FIG. 7 including reselection component 720, receives and the higher the modulation scheme, the higher the data rate for the UE.

Figure 4:
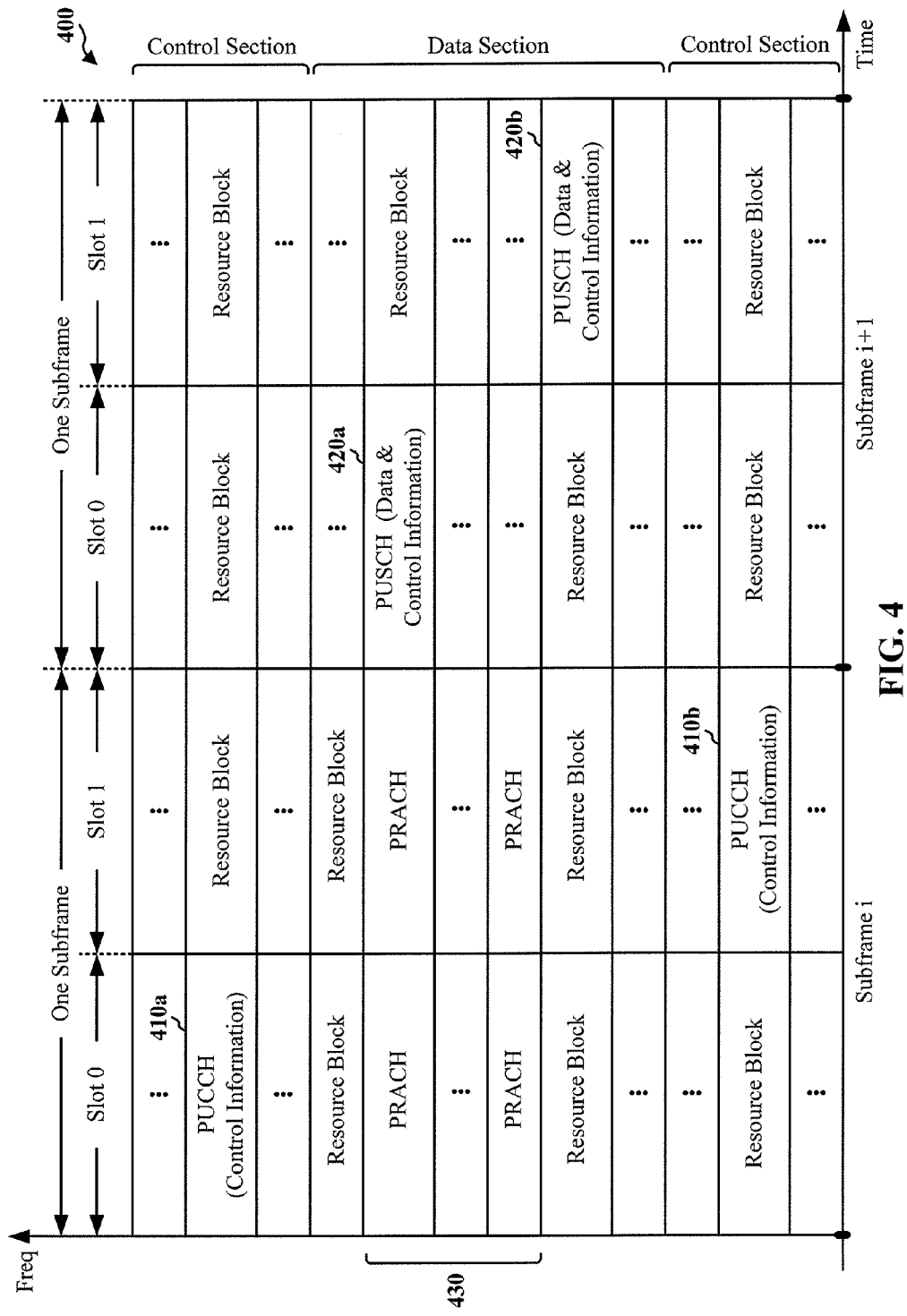
FIG. 4 is a diagram illustrating an example of an UL frame structure in LTE in accordance with an aspect of the present disclosure.

FIG. 4 is a diagram 400 illustrating an example of an UL frame structure in LTE, which may be transmitted by a UE, such as UE 702 (FIG. 7) that includes reselection component 720 (FIG. 7) as described herein. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE, such as UE 702 (FIG. 7) including reselection component 720, may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
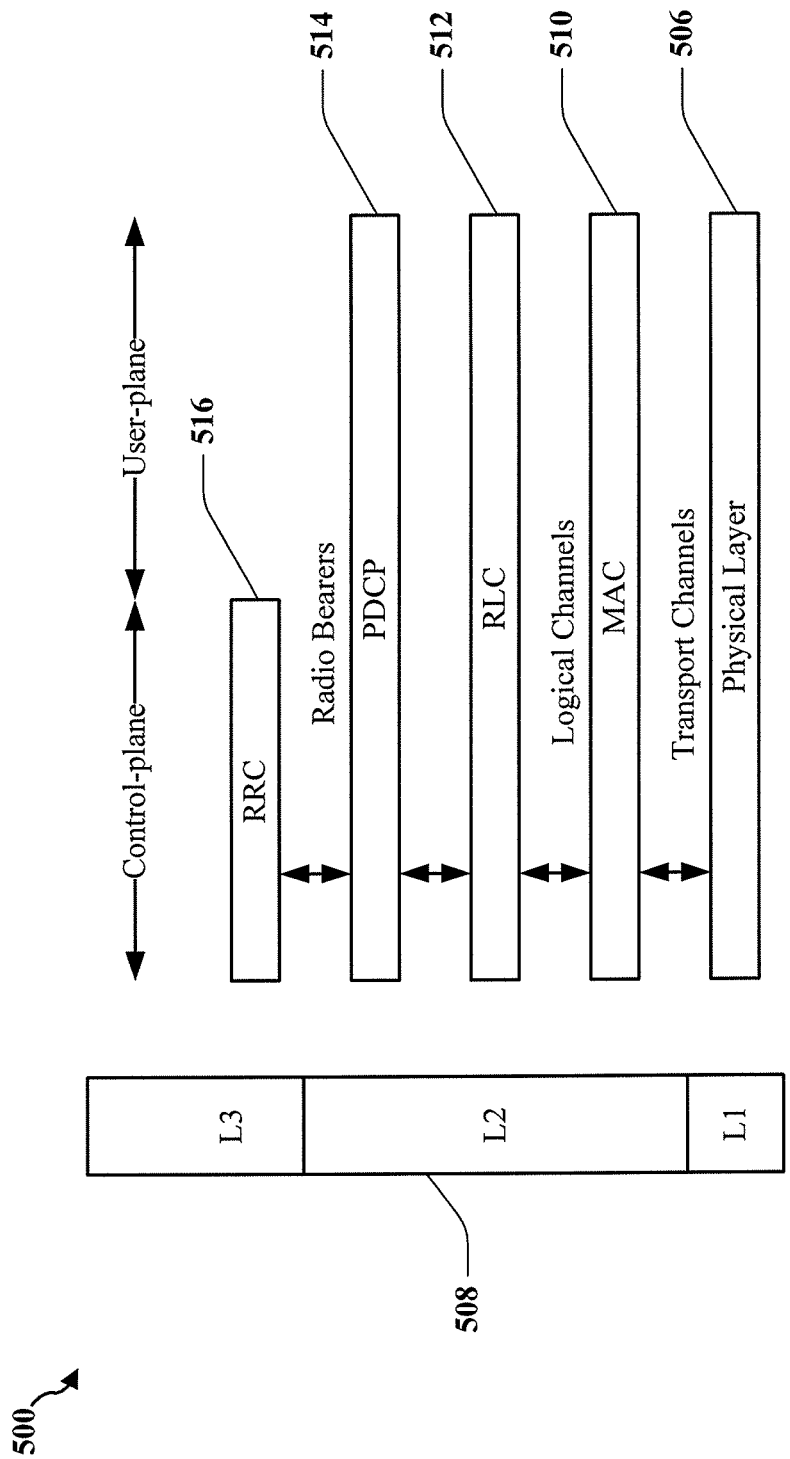
FIG. 5 is a diagram illustrating an example of a radio protocol architecture for the user and control planes in accordance with an aspect of the present disclosure.

FIG. 5 is a diagram 500 illustrating an example of a radio protocol architecture for the user and control planes in LTE. The radio protocol architecture may be used by a UE, such UE 702 (FIG. 7) including reselection component 720, and an eNB, and the radio architecture includes three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
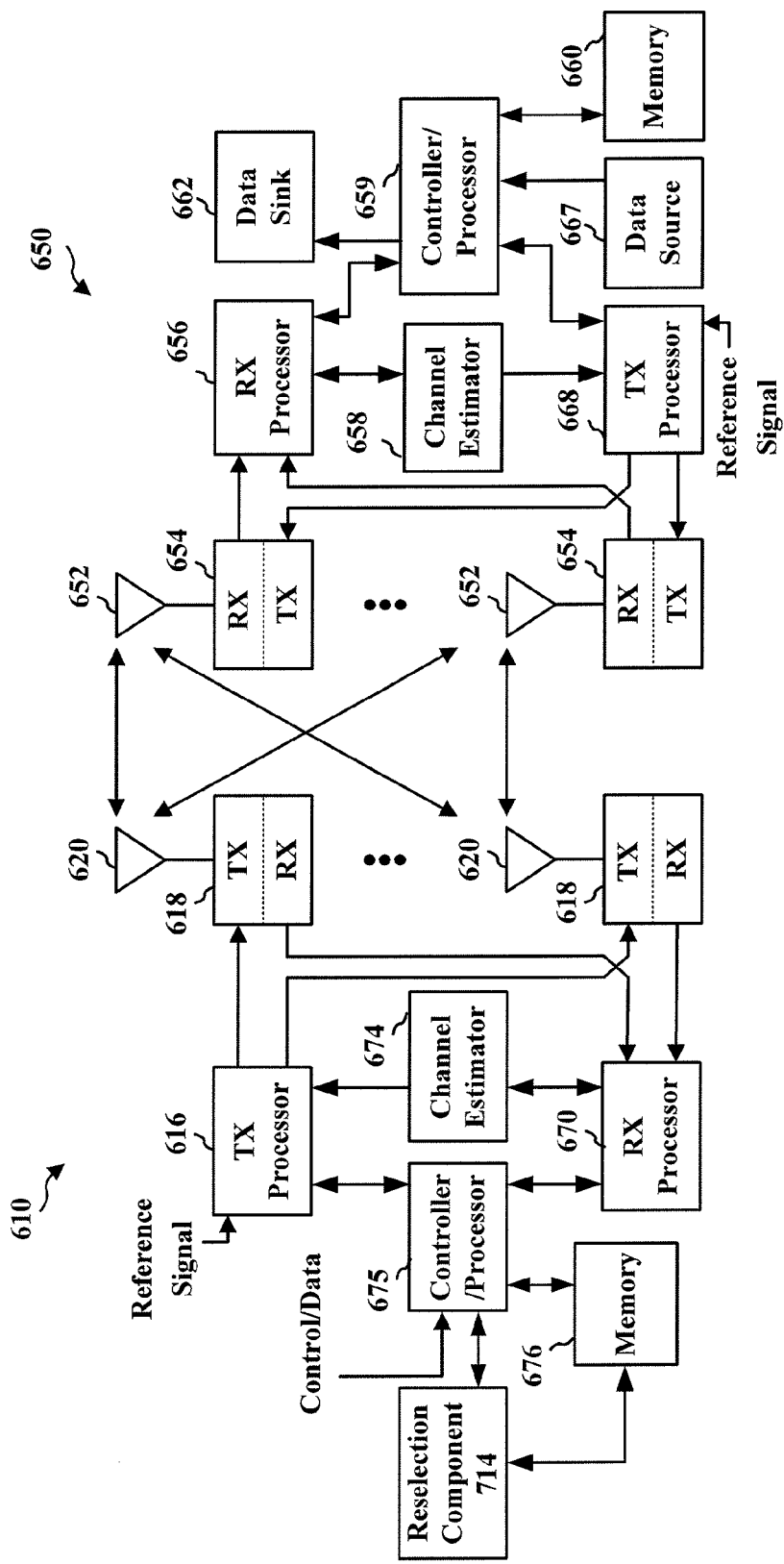
FIG. 6 is a diagram illustrating an example of an evolved Node B and user equipment in an access network in accordance with an aspect of the present disclosure.

FIG. 6 is a block diagram of an eNB 610 in communication with a UE 650 in an access network. UE 650 may the same or similar as UE 702 including reselection component 720 of FIG. 7. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
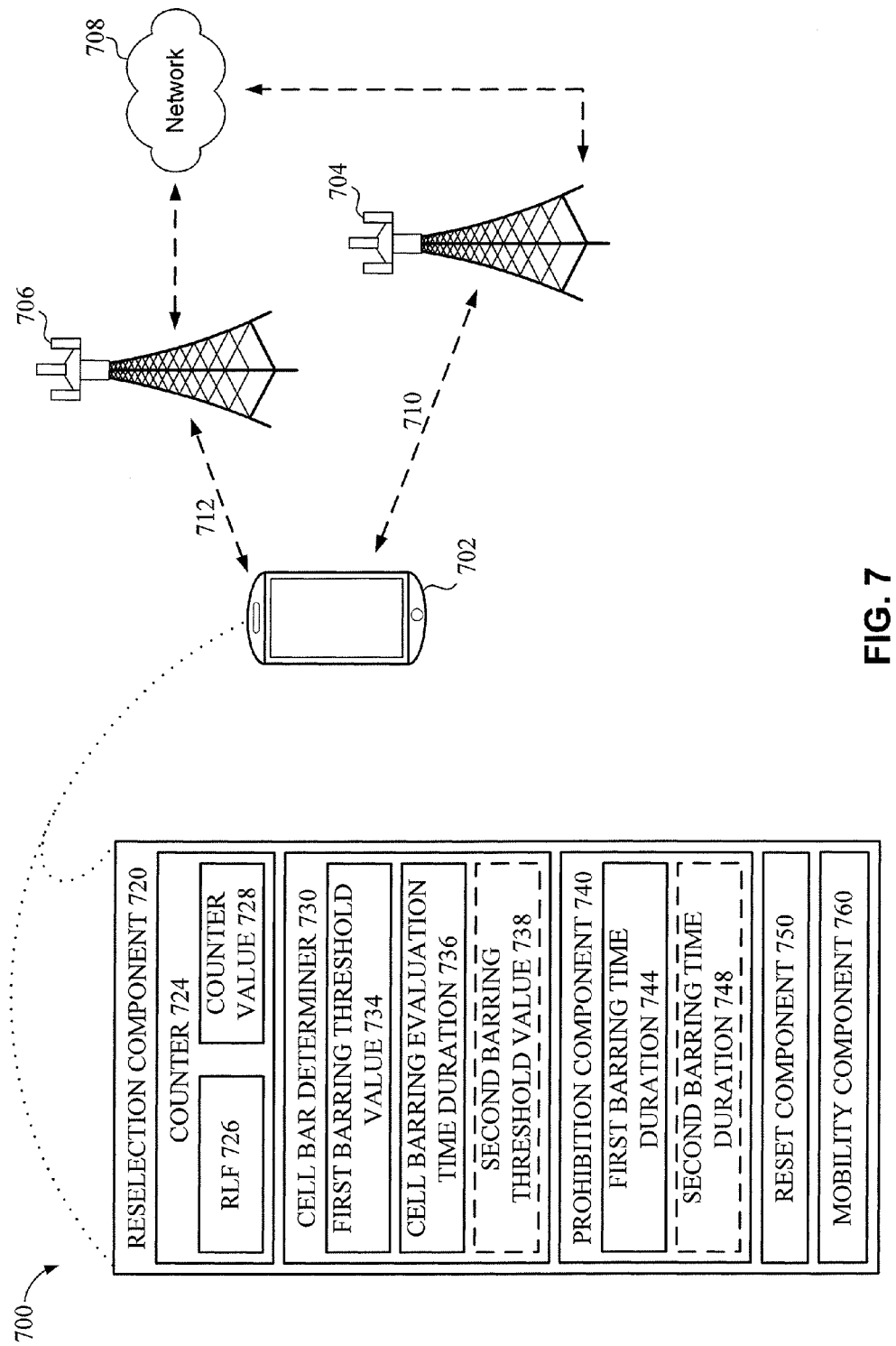
FIG. 7 is a schematic diagram of a communication network including an aspect of a user equipment that may prohibit reselection to a particular cell.

Referring to FIG. 7, in an aspect, a wireless communication system 700 includes at least one UE 702 in communication coverage of at least a first network entity 704 and a second network entity 706. UE 702 may communicate with network 708 via one or both of first network entity 704 and second network entity 706. In some aspects, multiple UEs including UE 702 may be in communication coverage with one or more network entities, including first network entity 704 and second network entity 706. For instance, UE 702 may communicate with first network entity 704 on or using one or more communication channels 710. Further, for example, UE 702 may communicate with second network entity 706 on or using one or more communication channels 712.

It should be understood that UE 702 may communicate with one or more cells included or deployed at one or both first network entity 704 and second network entity 706. That is, UE 702 may select or reselect from one cell at first network entity 704 to another cell at first network entity 704 or second network entity 706. Alternatively, UE 702 may select or reselect from one cell at second network entity 706 to another cell at first network entity 704 or second network entity 706. In another aspect, first network entity 704 may alternatively be referred to as a first cell with which UE 702 maintains an RRC connected state. Additionally, UE 702 may transmit and/or receive wireless communication to and/or from first network entity 704 and/or second network entity 706. For example, such wireless information may include, but is not limited to, information related to the detection of one or more RLFs 726.

In some aspects, UE 702 may also be referred to by those skilled in the art (as well as interchangeably herein) as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, a wireless transmit/receive unit, a device for Internet-of-Things, or some other suitable terminology.

Additionally, first network entity 704 and second network entity 706 may be a macrocell, small cell, picocell, femtocell, access point, relay, Node B, mobile Node B, UE (e.g., communicating in peer-to-peer or ad-hoc mode with UE 702), or substantially any type of component that can communicate with UE 702 to provide wireless network access at the UE 12.

According to the present aspects, UE 702 may include reselection component 720, which may be configured to prohibit reselection to a current serving cell or network entity (e.g., first network entity 704) for a given time duration to allow or permit UE 702 to reselect (e.g., via an RRC reestablishment procedure) to another cell (e.g., second network entity 706). For example, reselection component 720 may be triggered by detection of one or more RLFs, and may alleviate instances where UE 702 may experience continuous RLFs as a result of maintaining an RRC connection with the serving cell (e.g., first network entity 704).

In addressing the foregoing, reselection component 720 may be configured to alleviate such instances by prohibiting UE 702 from performing an RRC reestablishment procedure or reselection with first network entity 704 (e.g., serving cell) for an initial time duration in response to detection of an RLF. Even more, in aspects where the initial prohibition does not result in an reestablishment of an RRC connection with another cell (e.g., second network entity 706 or, optionally, a different cell of first network entity 704) providing enhanced coverage and signal strength, reselection component 720 may be configured to prohibit UE 702 from performing the RRC reestablishment procedure for a subsequent time duration longer than the initial time duration.

In an aspect, reselection component 720 may include counter 724, which may be configured to increment a counter value 728 associated with a first cell (e.g., first network entity 704). In some aspects, the incrementing may be based on a detection of an RLF 726 by UE 702. Additionally, UE 702 may be in an RRC connected state with the first cell (e.g., first network entity 704) during such incrementing and detection. In such aspects, counter 724 maintains a count or otherwise provides an indication of a number of RLFs 726 detected by UE 702 at, for example, first network entity 704. As such, counter value 728 indicates a corresponding number of RLFs detected by UE 702, for instance, in cell barring evaluation time duration 736. Counter value 728 may be transmitted to, or otherwise obtained by cell bar determiner 730 on a fixed, continuous or predetermined basis.

In additional aspects, reselection component 720 may include cell bar determiner 730, which may be configured to determine that counter value 728 meets or exceeds first barring threshold value 734 within cell barring evaluation time duration 736. For example, cell bar determiner 730 may be configured to monitor or otherwise continuously determine whether counter value 728 meets or exceeds first barring threshold value 734 during cell barring evaluation time duration 736. That is, upon detecting an RLF 726, which may or may not be a first RLF detected at UE 702, counter 724 may be initiated and cell bar determiner 730 may be configured to initiate cell barring evaluation time duration 736.

In other aspects, cell bar determiner 730 may be configured to continuously monitor the counter value 728 during consecutive cell barring evaluation time duration 736. For instance, rather to, or in addition to triggering cell barring evaluation time duration 736 upon detecting a first RLF, cell bar determiner may be configured to determine whether during cell barring evaluation time duration 736 has counter value 728 met or exceeded first barring threshold value 734. In other words, the cell barring evaluation time duration 736 may include at least a portion of a previous cell barring evaluation time duration.

In further aspects, cell bar determiner 730 may be configured to determine, in addition to the counter value 728 determinations, that the cell barring evaluation time duration 736 meets a cell barring evaluation time duration threshold value, which may be indicated as one or more units of time (e.g., milliseconds, seconds, etc.). That is, upon meeting the cell barring evaluation time duration threshold value, cell bar determiner 730 may determine whether counter value 728 meets or exceeds first barring threshold value 734. Moreover, a barring indication may be provided to prohibition component 740 upon determining that counter value 728 meets or exceeds first barring threshold value 734 during cell barring evaluation time duration 736.

Reselection component 720 may include prohibition component 740, which may be configured to prohibit UE 702 from performing an RRC reestablishment procedure with the first cell (e.g., first network entity 704) for first barring time duration 744. For example, upon detecting a predetermined and/or configurable number of RLFs 726 (e.g., as indicated by counter value 728) over the cell barring evaluation time duration 736, prohibition component 740 may be configured to prohibit UE 702 from performing an RRC reestablishment procedure with first cell, which may be the current serving cell (e.g., first network entity 704). Such prohibition may effectively permit UE 702 to reselect or perform RRC reestablishment to another more suitable cell (e.g., second network entity 706). Additionally, the prohibition may prevent reselection to a same cell or network entity (e.g., first network entity 704), which may be experiencing poor communication quality (e.g., the same cell or network entity causing the one or more RLFS 726). As such, UE 702 may perform an RRC reestablishment procedure with a second cell (e.g., second network entity 706) during first barring time duration 744.

In additional aspects, reselection component 720 may be configured to bar or otherwise prohibit UE 702 from selecting or performing RRC reestablishment to the first cell (e.g., first network entity 704) for longer time durations when experiencing further RLFs 726 even after the first barring time duration 744. That is, after the expiration of first barring time duration 744, and upon detecting a subsequent RLF 726 on the same cell that RRC reestablishment was prohibited (e.g., first network entity 704), UE 702, via reselection component 720 may be configured to employ a different set of parameters in order to increase the probability of a reselection to a more suitable cell (e.g., second network entity 706).

In order to do so, reselection component 720 may be configured to detect an RLF 726 of the first cell (e.g., first network entity 704) after expiration of first barring time duration 744. Further, cell bar determiner 730 may then be configured to determine that counter value 728 meets or exceeds second barring threshold value 738 within cell barring evaluation time duration 736. Upon such determination, prohibition component 740 may be configured to prohibit UE 702 from performing the RRC reestablishment procedure with the first cell (e.g., first network entity 704) for second barring time duration 748. As such, UE 702 may perform an RRC reestablishment procedure with a second cell (e.g., second network entity 706) during second barring time duration 748. It should be understood that in order to increase the probability of reselecting or establishing an RRC connection with a more suitable cell, second barring time duration 748 may be longer in duration than first barring time duration 744. Additionally, in some aspects, second barring threshold value 738 may be less than, equal to, or greater than first barring threshold value 734.

Additionally, reselection component 720 may include reset component 750, which may be configured to reset or otherwise regress to performing an RRC reestablishment on or at the first cell (e.g., first network entity 704) following an expiration of the first barring time duration 744 when a time duration between a first time value of a first detected RLF and a second time value of a second detected RLF meets or exceeds a reset time duration. Specifically, for example, reset component 750 may be configured to receive or otherwise detect at least a first RLF and a second RLF when in RRC connected state with the first cell (e.g., first network entity 704). Moreover, for each RLF, that is, the first RLF and the second RLF, a first time value corresponding to the first RLF and a second time value corresponding to the second RLF may be detected or otherwise determined. Reset component 750 may then be configured to determine whether the time duration between the first time value and the second time value meets or exceeds the reset time duration.

Hence, reset component 750 may be configured to determine whether a sufficient time duration has elapsed since the expiration of the first barring time duration 744 and the reception of at least the first RLF and the second RLF to reset or otherwise revert to the first barring determination. As such, when such a sufficient time duration (e.g., as determined by comparing the difference between the first and second RLFs to the reset time duration) has elapsed, rather than continuing to determine whether a second barring time duration 748 may be triggered (e.g., based on counter value 728 meeting or exceeding second barring threshold value 738), reset component 750 may be configured to reset or otherwise regress to determining whether counter value 728 meets or exceeds first barring threshold value 734. In such aspects, reset component 750 may trigger an RRC reestablishment with the first cell based at least in part on determining that the time duration between the first time value and second time value meets or exceeds the reset time duration.

In further aspects, reselection component 720 may include mobility component 760, which may be configured to perform an RRC reestablishment and/or reestablishment procedure with one or more cells. For example, mobility component 760 may be configured to perform an RRC reestablishment with first network entity 704 (e.g., first cell). In another example, mobility component 760 may be configured to perform an RRC reestablishment (e.g., reselection) with second network entity 706 (e.g., second cell) when prohibition component 740 is configured to prohibit UE 702, via mobility component 760, from performing an RRC reestablishment procedure with first network entity 704 as a result of counter value 728 meeting or exceeding first barring threshold value 734 or second barring threshold value 738.

Figure 8:
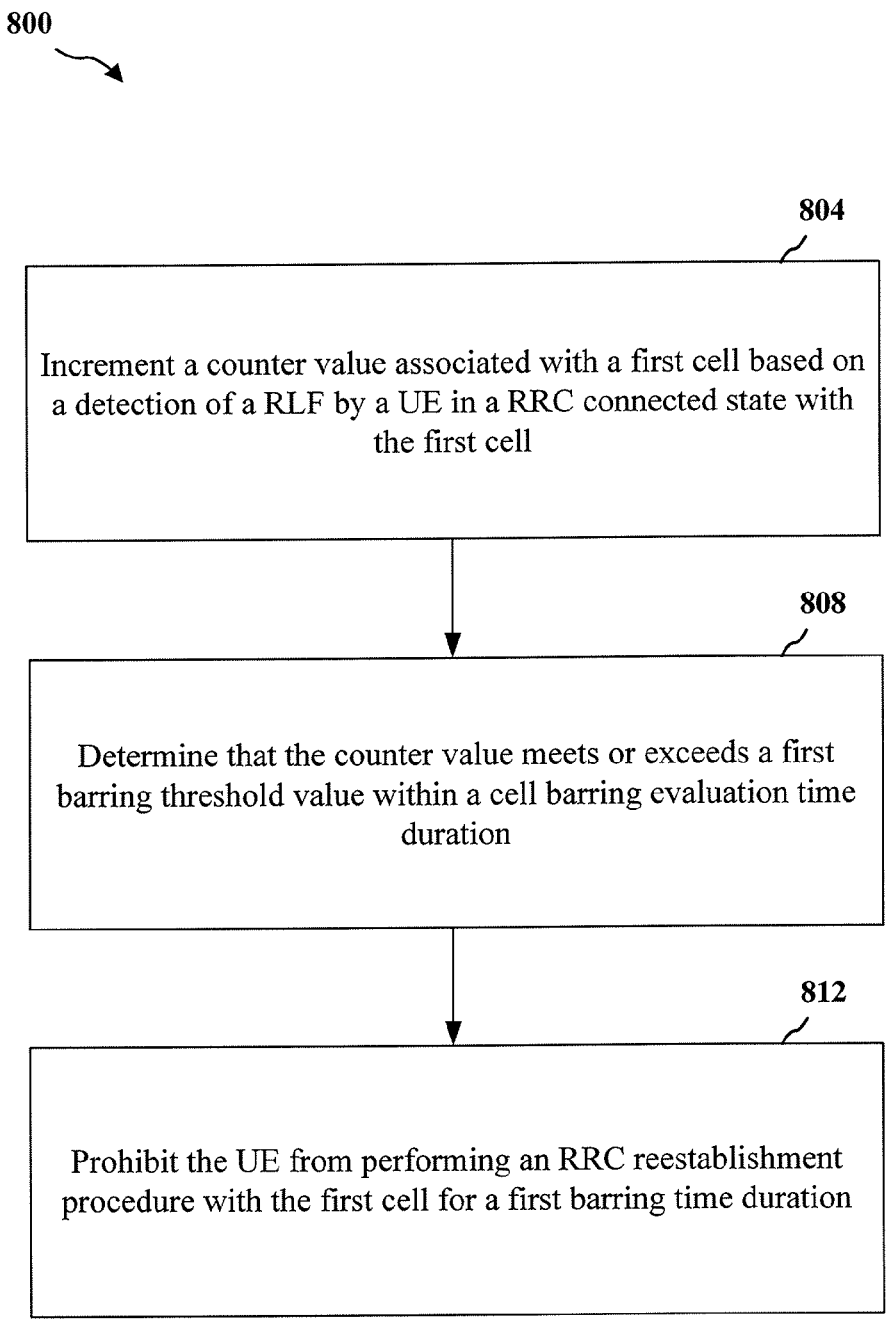
FIG. 8 is a flow chart of an aspect of the cell reselection features according to an aspect of the present disclosure, e.g., FIG. 7.
Figure 9:
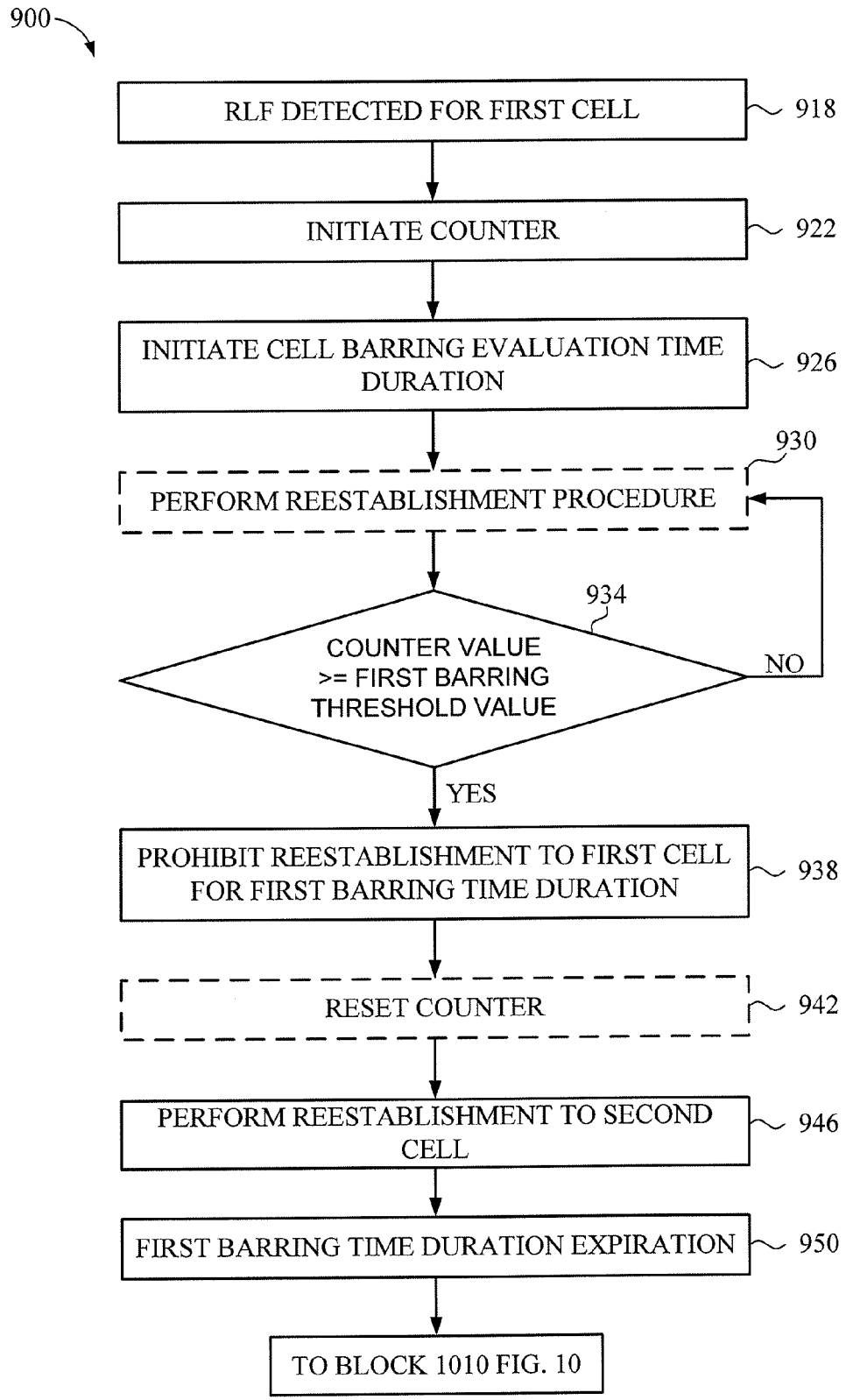
FIG. 9 is a flow chart of an aspect of the first barring time duration of the cell reselection features according to an aspect of the present disclosure, e.g., FIG. 7.
Figure 10:
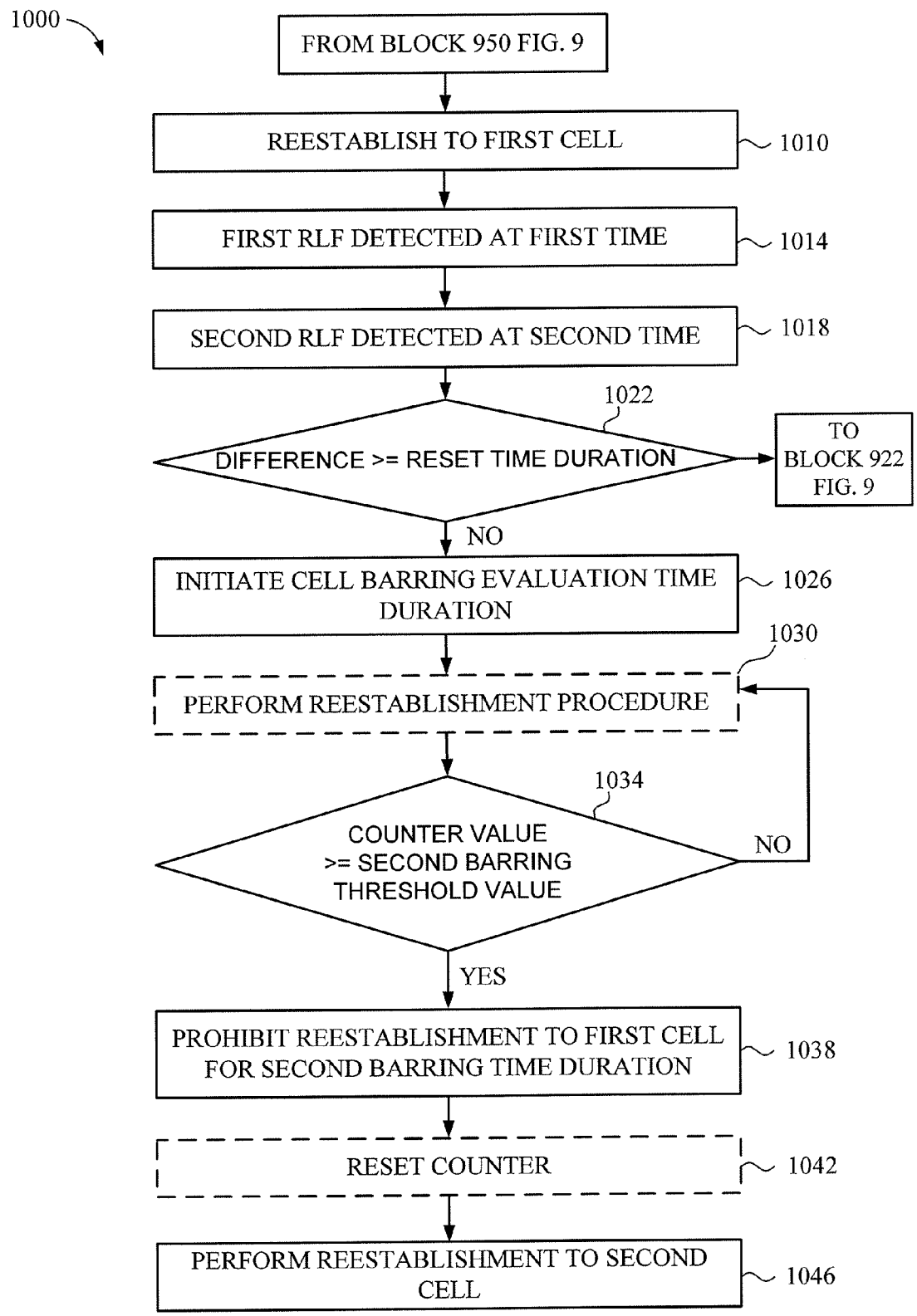
FIG. 10 is a flow chart of an aspect of the second barring time duration of the cell reselection features according to an aspect of the present disclosure, e.g., FIG. 7.

Referring to FIGS. 8-10, the methods are shown and described as a series of acts for purposes of simplicity of explanation. However, it is to be understood and appreciated that the methods (and further methods related thereto) are not limited by the order of acts, as some acts may, in accordance with one or more aspects, occur in different orders and/or concurrently with other acts from that shown and described herein. For example, it is to be appreciated that the methods may alternatively be represented as a series of interrelated states or events, such as in a state diagram. Moreover, not all illustrated acts may be required to implement a method in accordance with one or more features described herein.

Referring to FIG. 8, in an operational aspect, a UE such as UE 702 (FIG. 7) may perform one aspect of a method 800 for prohibiting cell selection (e.g., RRC reestablishment) with a serving cell (e.g., first network entity 704, FIG. 7) in order to permit cell selection (e.g., RRC reestablishment) with a second cell (e.g., second network entity 706).

In an aspect, at block 804, method 800 includes incrementing a counter value associated with a first cell based on a detection of a RLF by a UE in a RRC connected state with the first cell. For example, as described herein, reselection component 720 (FIG. 7) may execute counter 724 to increment a counter value 728 associated with a first cell (e.g., first network entity 704) based on a detection of an RLF 726 by a UE 702 in a RRC connected state with the first cell (e.g., first network entity 704, FIG. 7).

At block 808, method 800 includes determining that the counter value meets or exceeds a first barring threshold value within a cell barring evaluation time duration. For instance, as described herein, reselection component 720 (FIG. 7) may execute cell bar determiner 730 to determine that the counter value 728 meets or exceeds a first barring threshold value 734 within a cell barring evaluation time duration 736.

Further, at block 812, method 800 includes prohibiting the UE from performing an RRC reestablishment procedure with the first cell for a first barring time duration. For example, as described herein, reselection component 720 (FIG. 7) may execute prohibition component 740 prohibit the UE 702 from performing an RRC reestablishment procedure with the first cell (e.g., first network entity 704, FIG. 7) for a first barring time duration 744.

Referring to FIG. 9, in an additional and/or alternate operational aspect, a UE such as UE 702 (FIG. 7) may perform one aspect of a method 900 for prohibiting cell selection (e.g., RRC reestablishment) with a serving cell (e.g., first network entity 704, FIG. 7) for a first barring time duration. It should be understood that any one or more of the various component and/or subcomponents of UE 702 (FIG. 7) and/or reselection component 720 (FIG. 7) may be executed to perform the aspects described herein with respect to each block forming method 900.

In an aspect, method 900 may include detecting an RLF for the first cell at block 918. For instance, reselection component 720 (FIG. 7) may detect RLF 726 resulting from a failed radio link communication with first cell (e.g., first network entity 704). Method 900 may continue to block 922, where a counter is initiated as a result of the detection. In an example, reselection component 720 may execute counter 724 to initiate counter value 728 (e.g., to increment counter value 728 as reselection component 720 detects subsequent RLFs 726). Further, at block 926, method 900 includes initiating cell barring evaluation time duration. For instance, cell barring evaluation time duration 736 may be initiated upon detecting the first RLF for the first cell (e.g., first network entity 704). In other aspects, cell barring evaluation time duration may be continuously operating as described herein.

At block 930, method 900 may optionally perform reestablishment procedures with, for instance, the first cell. In such aspects, the performance of reestablishment procedures with the first cell may result in the detection of subsequent RLFs. As such, at block 934, method 900 determines whether the counter value meets or exceeds first barring threshold value. For example, as described herein, cell bar determiner 730 (FIG. 7) determines whether counter value 728 meets or exceeds first barring threshold value 734 during cell barring evaluation time duration 736. If the determination at block 934 is in the negative, then method 900 may return to optional block 930 or back to block 934. However, if the determination at block 934 is in the affirmative, or in other words, counter value meets or exceeds first barring threshold value, then method 900 may proceed to block 938, where reestablishment to the first cell may be prohibited for first barring time duration.

As such, UE 702 (FIG. 7) may be prevented from performing reestablishment to the first cell, which has caused UE 702 to experience one or more RLFs. At block 942, method 900 may optionally reset counter as the number of RLFs has met or exceeded the first barring threshold value 734. Further, at block 946, method 900 includes performing reestablishment to second cell (e.g., second network entity 706, FIG. 7) during the first barring time duration. At block 950, first barring time duration may expire. In some aspects, method 900 may continue to method 100 as shown in FIG. 10, where after an expiration of the first barring time duration, UE 702 reestablishes to the first cell at a subsequent point in time.

Referring to FIG. 10, in an additional and/or alternate operational aspect, a UE such as UE 702 (FIG. 7) may perform one aspect of a method 1000 for prohibiting cell selection (e.g., RRC reestablishment) with a (first) serving cell (e.g., first network entity 704, FIG. 7) for a second barring time duration when even after first barring time duration, one or more subsequent RLFs are detected at the (first) serving cell. It should be understood that any one or more of the various component and/or subcomponents of reselection component 720 (FIG. 7) may be executed to perform the aspects described herein with respect to each block forming method 1000.

In an aspect, method 1000 may continue from block 950 in FIG. 9 and include, at block 1010, reestablishing to the first cell at a subsequent point in time (e.g., after expiration of the first barring time duration). Further, method 1000 includes detecting a first RLF at a first time for the first cell at block 1014. In an aspect, the first RLF detected at the first time may be an RLF which results in a counter value meeting or exceeding the first barring threshold value (e.g., at block 934, FIG. 9). For instance, reselection component 720 (FIG. 7) may detect RLF 726, which may be indicative of the first RLF at the first time, resulting from a failed radio link communication with the first cell (e.g., first network entity 704). Additionally, at block 1018, method 1000 may include detecting a second RLF at a second time for the first cell. For example, reselection component 720 (FIG. 7) may detect RLF 726, which may be indicative of the second RLF at the second time, resulting from another failed radio link communication with the first cell (e.g., first network entity 704).

Further, at block 1022, method 1000 may determine whether a difference between the first time and the second time meets or exceeds a reset time duration. For instance, reselection component 720 may execute reset component 750 to determine whether a difference between the first time and the second time meets or exceeds the reset time duration. If the difference meets or exceeds the reset time duration, method 1000 may proceed or otherwise regress to block 922 (FIG. 9). In aspects not shown, if the difference meets or exceeds the reset time duration, method 1000 may optionally include performing an RRC reestablishment with the first cell (e.g., first network entity 704, FIG. 7). However, if the difference does not meet or exceed the reset time duration, method 1000 may proceed to block 1026.

In aspects not shown, method 1000 may optionally include initiating the counter as a result of the RLF detection. In an example, reselection component 720 may execute counter 724 to initiate counter value 728 (e.g., to increment counter value 728 as reselection component 720 detects subsequent RLFs 726). Further, at block 1026, method 1000 includes initiating cell barring evaluation time duration. For instance, cell barring evaluation time duration 736 may be initiated upon detecting an RLF for the first cell (e.g., first network entity 704). In other aspects, cell barring evaluation time duration may be continuously operating as described herein.

At block 1030, method 1000 may optionally perform reestablishment procedures with, for instance, the first cell. In such aspects, the performance of reestablishment procedures with the first cell may result in the detection of subsequent RLFs. As such, at block 1034, method 1000 determines whether the counter value meets or exceeds the first barring threshold value. For example, as described herein, cell bar determiner 730 (FIG. 7) determines whether counter value 728 meets or exceeds second barring threshold value 734 during cell barring evaluation time duration 736. In other aspects of block 1034, method 1000 may determine whether a number of RLFs meets or exceeds the first barring threshold value without, for example, the use of a counter. If the determination at block 1034 is in the negative, then method 1000 may return to optional block 1030 or back to block 1034. However, if the determination at block 1034 is in the affirmative, or in other words, the counter value meets or exceeds second barring threshold value, then method 1000 may proceed to block 1038, where reestablishment to the first cell may be prohibited for the second barring time duration.

As such, UE 702 (FIG. 7) may be prevented from performing reestablishment to the first cell, which has caused UE 702 to experience one or more RLFs. In such aspects, the second barring time duration may be longer in duration than the first barring time duration so as to increase the probability that UE 702 (FIG. 7) will reselect to a more suitable cell. At block 1042, method 1000 may optionally reset counter as the number of RLFs has met or exceeded the second barring threshold value 734. Further, at block 1046, method 1000 includes performing reestablishment to second cell (e.g., second network entity 706, FIG. 7) during the second barring time duration.

Figure 11:
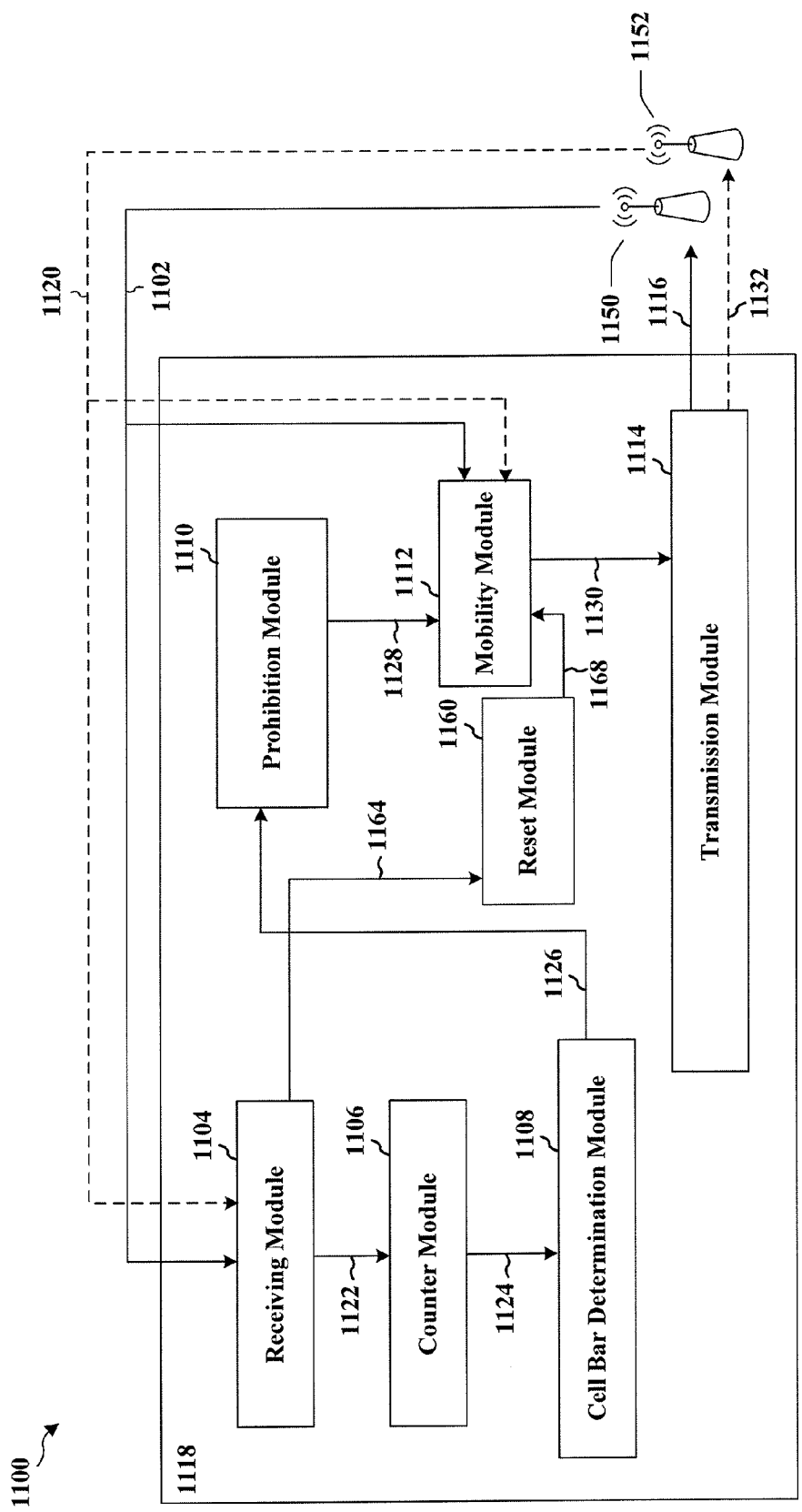
FIG. 11 is a conceptual data flow diagram illustrating the data flow between different modules/means/components in an example apparatus according to an aspect of the present disclosure.

Referring to FIG. 11, data flow 1100 illustrates an example flow between different modules/means/components in an example apparatus 1118 according to an aspect of the present disclosure. The apparatus may be a UE, such as UE 702 including reselection component 720 of FIG. 7. Apparatus 1118 includes receiving module 1104 for receiving wireless information 1102 from network entity 1150 (e.g., eNodeB) that lends in identifying or detecting an RLF. For example, wireless information 1102 may be indicative of a signal strength of network entity 1150. Further, as an example, wireless information 1102 and/or 1120 may be indicative of a measurement by receiving module 1104, which may then be used to compare the measurement to a lower threshold corresponding to whether the signal is strong enough to maintain a call (e.g., RRC connected state). Additionally, receiving module 1104 may optionally receive wireless information 1120 from second network entity 1152, which may be indicative of a signal strength of second network entity 1152. Further, Apparatus 1118 may include counter module 1106 for incrementing a counter value associated with first cell (e.g., network entity 1150) based on a detection of an RLF 1122 by receiving module 1104 in an RRC connected state with the first cell (e.g., network entity 1150).

Additionally, apparatus 1118 may include cell bar determination module 1108 for determining that the counter value 1124 meets or exceeds a first barring threshold value within a cell barring evaluation time duration. Apparatus 1118 may further include prohibition module 1110 for prohibiting apparatus 1118 from performing an RRC reestablishment procedure with the first cell (e.g., network entity 1150) for a first barring time duration upon receiving a prohibition trigger indication 1126 from cell bar determination module 1108. In additional aspects, apparatus 1118 may include reset module 1160 for resetting or otherwise reverting to performing RRC reestablishment 1168 with the first cell (e.g., network entity 1150) when a difference between a first detection time of a first RLF and a second detection time of a second RLF (e.g., 1164 may include detection times for one or more received RLFs) meets or exceeds a reset time duration. In further aspects, MME 112 may receive a prohibition indication 1128 to prohibit performing an RRC reestablishment procedure 1130 with a second cell (e.g., second network entity 1151) during the first barring time duration. Moreover, transmission module 1114 may send/transmit one or more communications 1116 and/or 1132 (e.g., RRC reestablishment related signals) to one or more network entities.

The apparatus may include additional modules that perform each of the steps of the algorithm in the aforementioned flow diagram of FIG. 11. As such, each step in the aforementioned flow diagram of FIG. 11 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 12:
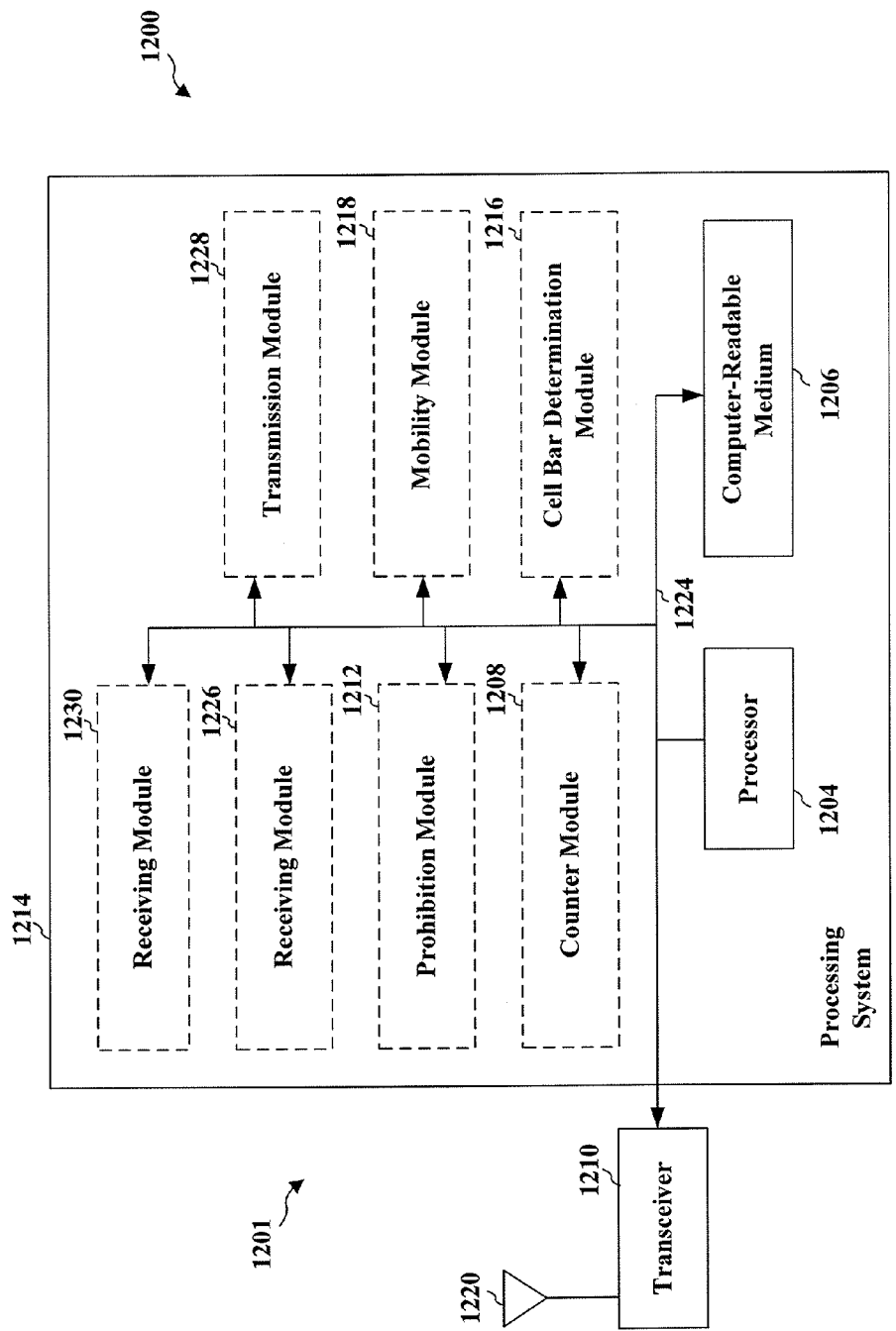
FIG. 12 is a diagram illustrating an example of a hardware implementation for an apparatus employing a processing system according to an aspect of the present disclosure.

FIG. 12 is a diagram 1200 illustrating an example of a hardware implementation for an apparatus 1201 employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware modules, represented by the processor 1204, the modules 1208, 1212, 1216, 1218, 1226, 1228, 1230, and the computer-readable medium 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The processing system 1214 includes a processor 1204 coupled to a computer-readable medium 1206. The processor 1204 is responsible for general processing, including the execution of software stored on the computer-readable medium 1206. The software, when executed by the processor 1204, causes the processing system 1214 to perform the various functions described supra for any particular apparatus. The computer-readable medium 1206 may also be used for storing data that is manipulated by the processor 1204 when executing software.

The processing system further includes at least one of the modules 1208, 1212, 1216, 1218, 1226, 1228 and 1230. The modules may be software modules running in the processor 1204, resident/stored in the computer readable medium 1206, one or more hardware modules coupled to the processor 1204, or some combination thereof. The processing system 1214 may be a component of the UE 650 (FIG. 6) and may include the memory 660 and/or at least one of the TX processor 668, the RX processor 656, and the controller/processor 659. In other aspects, the processing system 1214 may be a component of the UE 702 (FIG. 7) including reselection component 720.

It is understood that the specific order or hierarchy of steps in the processes disclosed is an illustration of example approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of enhanced radio resource control (RRC) reestablishment in a communication system, comprising:
   incrementing a counter value associated with a first cell based on a detection of a radio link failure (RLF) by a user equipment (UE) in a RRC connected state with the first cell;
   determining that the counter value meets or exceeds a first barring threshold value within a cell barring evaluation time duration;
   prohibiting the UE from performing an RRC reestablishment procedure with the first cell for a first barring time duration in response to a determination that the counter value meets or exceeds the first barring threshold value within the cell barring evaluation time duration;
   detecting a first RLF and a second RLF for the first cell that occur after expiration of the first barring time duration, wherein the first RLF is detected at a first time value and the second RLF is detected at a second time value;
   determining that a time duration between the first time value and second time value meets or exceeds a reset time duration; and
   performing an RRC reestablishment with the first cell in response to a determination that the time duration between the first time value and second time value meets or exceeds the reset time duration.

2. The method of claim 1, further comprising performing an RRC reestablishment procedure with a second cell during the first barring time duration.

3. The method of claim 1, further comprising:
   determining that the counter value meets or exceeds a second barring threshold value within the cell barring evaluation time duration; and prohibiting the UE from performing the RRC reestablishment procedure with the first cell for a second barring time duration.

4. The method of claim 3, further comprising performing an RRC reestablishment procedure with a second cell during the second barring time duration.

5. The method of claim 3, wherein the second barring time duration is longer in duration than the first barring time duration.

6. The method of claim 3, wherein the second barring threshold value is equal to the first barring threshold value.

7. The method of claim 3, wherein the second barring threshold value is less than or greater than the first barring threshold value.

8. The method of claim 1, wherein the determining includes determining that the cell barring evaluation time duration meets a cell barring evaluation time duration threshold value.

9. The method of claim 1, wherein the cell barring evaluation time duration includes at least a portion of a previous cell barring evaluation time duration.

10. A non-transitory computer-readable medium storing computer executable code for enhanced radio resource control (RRC) reestablishment, comprising:
code for incrementing a counter value associated with a first cell based on a detection of a radio link failure (RLF) by a user equipment (UE) in a RRC connected state with the first cell;
code for determining that the counter value meets or exceeds a first barring threshold value within a cell barring evaluation time duration; and
code for prohibiting the UE from performing an RRC reestablishment procedure with the first cell for a first barring time duration in response to a determination that the counter value meets or exceeds the first barring threshold value within the cell barring evaluation time duration;
code for detecting a first RLF and a second RLF for the first cell that occur after expiration of the first barring time duration, wherein the first RLF is detected at a first time value and the second RLF is detected at a second time value;
code for determining that a time duration between the first time value and second time value meets or exceeds a reset time duration; and
code for performing an RRC reestablishment with the first cell in response to a determination that the time duration between the first time value and second time value meets or exceeds the reset time duration.

11. The non-transitory computer-readable medium of claim 10, further comprising code for performing an RRC reestablishment procedure with a second cell during the first barring time duration.

12. The non-transitory computer-readable medium of claim 10, further comprising:
code for determining that the counter value meets or exceeds a second barring threshold value within the cell barring evaluation time duration; and
code for prohibiting the UE from performing. the RRC reestablishment procedure with the first cell for a second barring time duration.

13. The non-transitory computer-readable medium of claim 12, further comprising code for performing an RRC reestablishment procedure with a second cell during the second barring time duration.

14. An apparatus for enhanced radio resource control (RRC) reestablishment in a communication system, comprising:
means for incrementing a counter value associated with a first cell based on a detection of a radio link failure (RLF) by a user equipment (UE) in a RRC connected state with the first cell;
means for determining that the counter value meets or exceeds a first barring threshold value within a cell barring evaluation time duration;
means for prohibiting the UE from performing an RRC reestablishment procedure with the first cell for a first barring time duration in response to a determination that the counter value meets or exceeds the first barring threshold value within the cell barring evaluation time duration;
means for detecting a first RLF and a second RLF for the first cell that occur after expiration of the first barring time duration, wherein the first RLF is detected at a first.time value and the second RLF is detected at a second time value;
means for determining that a time duration between the first time value and second time value meets or exceeds a reset time duration; and
means for performing an RRC reestablishment with the first cell in response to a determination that the time duration between the first time value and second time value meets or exceeds the reset time duration.

15. The apparatus of claim 14, further comprising means for performing an RRC reestablishment procedure with a second cell during the first barring time duration.

16. The apparatus of claim 14, further comprising:
means for determining that the counter value meets or exceeds a second barring threshold value within the cell barring evaluation time duration; and
means for prohibiting the UE from performing the RRC reestablishment procedure with the first cell for a second barring time duration.

17. The apparatus of claim 16, further comprising means for performing an RRC reestablishment procedure with a second cell during the second barring time duration.

18. An apparatus for enhanced radio resource control (RRC) reestablishment in a communication system, comprising:
a reselection component configured to increment a counter value associated with a first cell based on a detection of a radio link failure (RLF) by a user equipment (UE) in a RRC connected state with the first cell;
a cell bar determiner configured to determine that the counter value meets or exceeds a first barring threshold value within a cell barring evaluation time duration;
a prohibition component configured to prohibit the UE from performing an RRC reestablishment procedure with the first cell for a first barring time duration in response to a determination that the counter value meets or exceeds the first barring threshold value within the cell barring evaluation time duration;
a reset component; and
a mobility component,
wherein the reselection component is further configured to detect a first RLF and a second RLF for the first cell that occur after expiration of the first barring time duration, wherein the first RLF is detected at a first time value and the second RLF is detected at a second time value, wherein the reset component is configured to determine that a time duration between the first time value and second time value meets or exceeds a reset time duration, and wherein the mobility component is configured to perform an RRC reestablishment with the first cell in response to a determination that the time duration between the first time value and second time value meets or exceeds the reset time duration.

19. The apparatus of claim 18, further comprising a mobility component configured to perform an RRC reestablishment procedure with a second cell during the first barring time duration.

20. The apparatus of claim 18, wherein the cell bar determiner is further configured to determine that the counter value meets or exceeds a second barring threshold value within the cell barring evaluation time duration; and wherein the prohibition component is further configured to prohibit the UE from performing the RRC reestablishment procedure with the first cell for a second barring time duration.

21. The apparatus of claim 20, wherein the mobility component is further configured to perform an RRC reestablishment procedure with a second cell during the second barring time duration.

22. The apparatus of claim 20, wherein the second barring time duration is longer in duration than the first barring time duration.

23. The apparatus of claim 20, wherein the second barring threshold value is equal to the first barring threshold value.

24. The apparatus of claim 20, wherein the second barring threshold value is less than or greater than the first barring threshold value.

25. The apparatus of claim 18, wherein the determining includes determining that the cell barring evaluation time duration meets a cell barring evaluation time duration threshold value.

26. The apparatus of claim 18, wherein the cell barring evaluation time duration includes at least a portion of a previous cell barring evaluation time duration.

* * * * *